(12) United States Patent
Zanetti (10) Patent No.: US 12,255,689 B2
(45) Date of Patent: Mar. 18, 2025

(54) REMOVABLE MULTIMEDIA PLUG FOR AOC ACTIVE OPTICAL CABLE

(71) Applicant: Luca Zanetti, Orlando, FL (US)

(72) Inventor: Luca Zanetti, Orlando, FL (US)

( * ) Notice: Subject to any disclaimer, the term of this patent is extended or adjusted under 35 U.S.C. 154(b) by 0 days.

(21) Appl. No.: 16/930,729

(22) Filed: Jul. 16, 2020

(65) Prior Publication Data

US 2022/0368424 A1   Nov. 17, 2022

(51) Int. Cl.
*H04B 10/40* (2013.01)
*G02B 6/42* (2006.01)

(52) U.S. Cl.
CPC ........... *H04B 10/40* (2013.01); *G02B 6/4246* (2013.01); *G02B 6/4292* (2013.01)

(58) Field of Classification Search
CPC ..... H04B 10/40; G02B 6/4246; G02B 6/4292
See application file for complete search history.

(56) References Cited

U.S. PATENT DOCUMENTS

| | | | | |
|---|---|---|---|---|
| 2007/0237462 A1* | 10/2007 | Aronson | ............... | G02B 6/4292 385/89 |
| 2011/0255827 A1* | 10/2011 | Schmidt | ............... | G02B 6/4201 29/874 |
| 2013/0129340 A1* | 5/2013 | Coli | ............... | H04B 10/0731 398/115 |

(Continued)

OTHER PUBLICATIONS

Fiberonsale, "5M(16.4ft) 40GBASE QSFP+ to LC_SC_ST_FC Connector(8) Breakout Active Optical Cable", Jul. 2019 (Year: 2019).*

*Primary Examiner* — Pranesh K Barua
(74) *Attorney, Agent, or Firm* — Barry Choobin; Patent 360

(57) ABSTRACT

The present disclosure is directed to a user friendly removable AOC over fiber connection system that simplifies consumer installation and maintenance for optical transmission of high-speed uncompressed video and data over long distances, including a removable optical transmitter and a removable optical receiver. The optical transmitter including a transmitting circuitry configured to receive electrical or optical signals from a source device; at least one laser configured into the transmitting circuitry for converting the electrical signals into light signals; it can be present but is not mandatory an interface electrically connected to the transmitting circuitry and configured to connect the transmitting circuitry to the source device; and one or a plurality of optical connectors connected to the transmitting circuitry for receiving the light signals, the optical connectors configured to removably connect to a plurality of transmitting optical fibers for transmitting light signals. The optical receiver including a receiving circuitry configured to receive the light signals from the transmitting optical fibers and convert the light signals into the electrical signals. It can be present but is not mandatory an interface electrically connected to the transmitting circuitry and configured to connect the transmitting circuitry to the source device. The shape of the removable connection may vary; can be of a simple plug male or female, or can be in a shaped as a keystone to be inserted in a wallplate male or female, or can be a complete wallplate shape or any other shape not described here.

18 Claims, 11 Drawing Sheets

(56) References Cited

U.S. PATENT DOCUMENTS

| | | | |
|---|---|---|---|
| 2014/0178015 A1* | 6/2014 | Tong | G02B 6/4242 |
| | | | 385/88 |
| 2015/0260934 A1* | 9/2015 | Downie | G02B 6/4292 |
| | | | 385/17 |
| 2017/0047997 A1* | 2/2017 | Chen | G02B 6/44715 |
| 2018/0213305 A1* | 7/2018 | Campos | H04Q 11/0005 |
| 2020/0244368 A1* | 7/2020 | Rector | H04B 10/0799 |

* cited by examiner

REMOVABLE MULTIMEDIA PLUG FOR AOC ACTIVE OPTICAL CABLE

FIELD OF INVENTION

The present disclosure relates to a consumer oriented easy removable connection system for optical transmission or high-speed transmission of uncompressed video and data over long distances, and particularly, relates to a plug and play optical transmitter and a plug and play optical receiver for easy connection and replacement of multimedia optic terminations.

BACKGROUND

Video distribution through walls, conduits and drywalls today requires custom large circuits behind the wall plates, also called HDMI wall plate extenders, which are complex, expensive, and require in-wall wiring to a permanent power supply, creating in-wall heating and continuous electricity consumption on the monthly bill. Also, these "HDMI extenders" usually works over CAT-5, 6, 7, or 8 copper cables which require the video quality to be compressed as no CAT-x cable can offer the new video bandwidth of 48 gigabits per second required by the 4K+ HD 120 FPS or the new 8K HDMI 2.1.

Thus, a need is appreciated for a transmission system that can transfer copious amounts of data over long distances without any signification attenuation and could be used to transmit uncompressed high bandwidth video data.

The consumer today need copious amount of data that only professional supports like fiber optic can carry. On one side the consumer needs a connection for high profile cable, on the other side the connection needs to be easy to use and interchangeable. In other words consumer need fiber optic technology but made easy for home use.

Thus, a need is appreciated for an easy removable connection system, consumer grade, that can be easily used by consumers but with the technology speed and reliability of the highly professional and fiber optic technology.

Because professional technology is given to non-professional consumer use, the plug going into the source device and final device can break or fail, while being pulled in the drywall or conduit, can be trampled, broken by forcing into receptacle, or any other cause of decay or wear and tear.

Thus, a need is appreciated for an easy removable connection system, consumer grade, that can be exchanged in case of failure, without the burden of exchanging the whole cable already pulled into the wall or conduit.

Final user need all the features related to the HDMI standard, including but not limited to HDMI2.1 including CEC and ARC/EARC Thus, a need is appreciated for a removable connection where the standard HDMI features are not decreased or modified.

Optical terminations have optical laser converters inside. Laser which is used in the transmitter an receiver has a lifespan of 10.000 to 50.000 hours depending on the quality if the laser. After 10.000 hours the laser begins to fade. On the opposite a fiber optic cable itself can last 25 years with no issue in any conduit or drywall or even under the sea.

Thus a need is appreciated for a transmitter and receiver, removable from the fiber optic cable, that can be exchanged and maintained, without the need to change the cable, which is already pulled in place in the wall or conduit, and has 10 times the life expectation of the transmitter and receiver termination.

HDMI connector standard size can be big to run into a conduit or drywall. It can be hard to run the HDMI standard plug attached to the HDMI standard cable into the walls conduits, not to mention that while pulling in the walls, the connector can detach from the cable. HDMI fiber optic based cannot be repaired on the field and the cable need to be pulled out and exchanged.

Thus, a need is appreciated for a detachable connection that leaves the cable small, facilitates to pull the cable in the walls/conduits, and the connector can be added after the cable is in place During construction, multimedia cables are pulled while the walls are not yet completed. Delicate cables such as an example HDMI can be broken during the ending phases of the construction. HDMI over fiber optic connector cannot be repaired on the field.

Thus a need is appreciated for a detachable connector that can be attached to its cable, which is already in place in the walls, after construction and furnishing is complete, to preserve the integrity of the transmitter/receiver termination.

SUMMARY OF THE INVENTION

The principal object of the present invention is therefore directed to a removable connector for optical transmission system for high-speed transmission of uncompressed video and data over long distances.

In one aspect disclosed herein is a removable connector for optical transmission system for high-speed transmission of uncompressed video and data over long distances that includes a removable optical transmitter and a removable optical receiver. The removable optical transmitter can receive electrical signals from a source device and converts the electrical signals to light signals for transmission through optical fibers. The removable optical receiver can receive the light signals from the optical fiber and converts the light signals to electrical signals for the target media device.

In one aspect, the removable optical transmission system disclosed herein can be powered directly from the source device, and thus consumes power only when in use. This saves energy, and the system does not unnecessary heats up.

In one aspect, the removable optical transmission system disclosed herein can be powered from external USB for higher performance.

In one aspect, the removable optical transmission system disclosed herein can be powered directly from the source device, and can have a secondary output for CEC, ARC/EARC and future or similar evolution of those.

In one aspect, the removable optical transmitter comprises a transmitting circuitry, the first interface for coupling with the source device, and a vertical-cavity surface-emitting laser (VCSEL) that converts the electrical signals from the source device into light signals. In one case, the first interface can be an HDMI interface for receiving HDMI electrical signals. In one case, the first interface can be a USB interface for receiving USB electrical signals.

In one case, the optical receiver comprises a receiving circuitry for converting the light signals back to the electrical signals, a second interface for coupling the receiving circuitry with the target device. In one case, the second interface is the same as the first interface. For example, the second interface is also HDMI when the first interface is HDMI.

In one case, all the signals are carried through fiber optic

In one case, signal are partially carried by fiber optic and part by copper.

These and other objects and advantages of the embodiments herein will become readily apparent from the following detailed description.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

Figure 1:
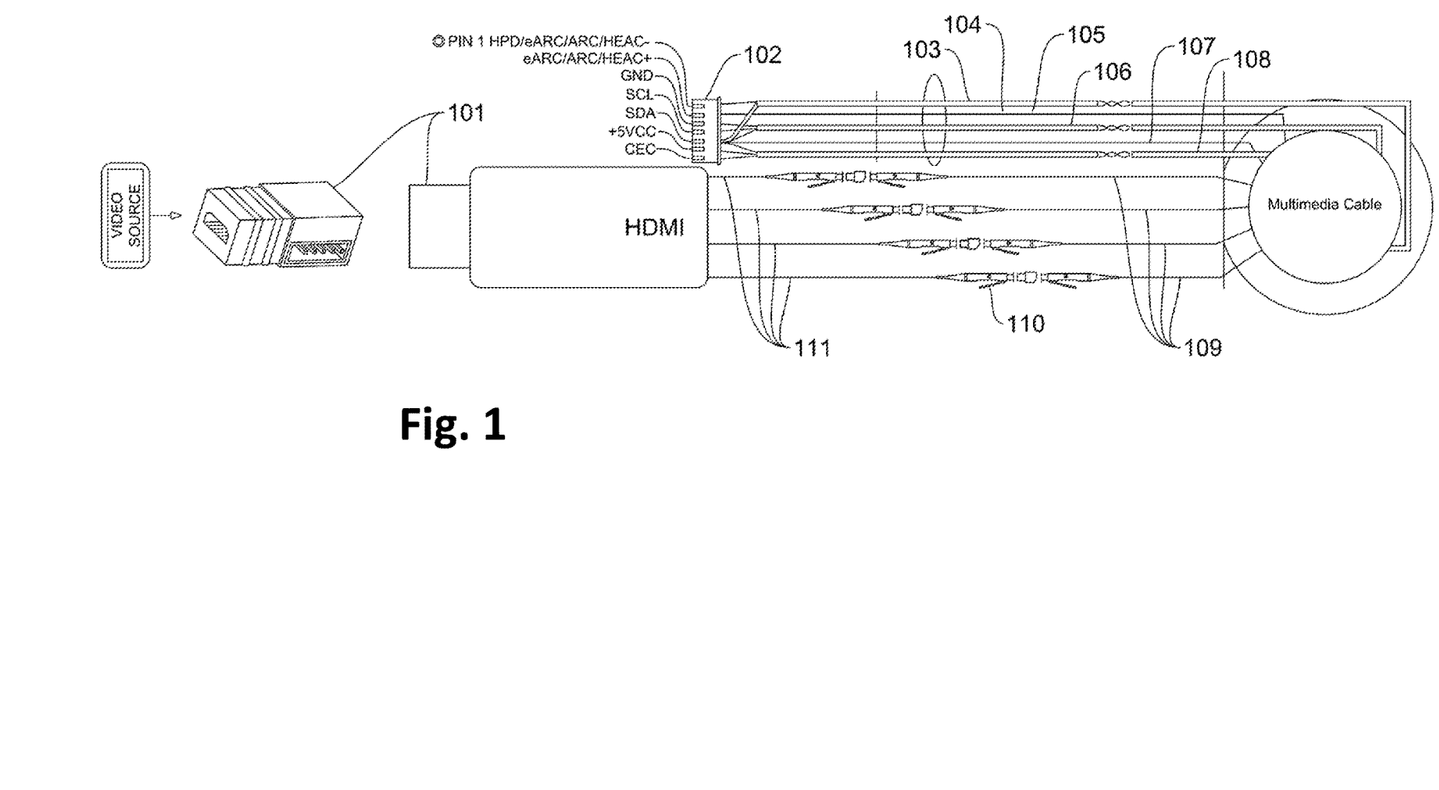
FIG. 1 is a perspective view of an optical transmitter having an HDMI interface, according to an embodiment of the present invention.

Now referring to FIG. 1, which is a perspective view of an optical transmitter 101 according to one implementation of the present invention. The optical transmitter 101 is shown to be included in different models of housing enclosing a transmitting circuitry and laser. The optical transmitter 101 provides for high bandwidth data transfer over long distances, for example, 1000 feet and more without any lag. The optical transmitter 101 can transfer full speed uncompressed video data through optical fiber cables. The optical transmitter 101 can be powered by the source device, for example, set-top box. In one implementation, the laser can be VCSEL laser technology that can convert the HDMI, display port or USB electrical signals to light signals. The optical fibers offer negligible attenuation to the light signals up to 1000 feet, thus permitting 4K plus resolution uncompressed video data to be transmitted for more than 1000 feet without any significant lag. It is to be noted that any other laser known to a skilled person for converting electrical signals into light signals for transmitting the light signals through optical fiber cables can be used without departing from the scope of the present invention. Besides lasers, any technology known to a skilled person for converting electrical signals into light signals for transmitting the light signals through optical fiber cables can be used without departing from the scope of the present invention.

In one aspect, the optical transmitter 101 can transmit audio & video data and control signals through optical fiber cables. Also, the optical transmitter 101 consumes comparatively very much less power than conventional HDMI or display port extenders and thus can be powered by the source device itself. Thus, the optical transmitter 101 only consumes electricity when in use, saving energy.

Referring to FIG. 1, four optical connectors 110 can be seen extending from the housing 101. The optical connectors 110 can be removably connected to any standard optical fiber cable, thus making the disclosed optical transmission system versatile. The connectors 110 allow the standard optical fiber cable to be removed and replaced. The standard optical fiber cable can be any commercially available optical fiber cables that can be provided with connectors compatible with the connectors 110 of optical transmitter 101. For example, LC OM3 connectors, as shown in FIG. 1, can be used that are both economically and easily available. The four fiber optics 111 can be single fibers with LC connector or four to six fibers going into a single MPO connector standard. The optical connectors 110 can be any other number of fibers, four is the optimum number for 4K video but it is possible to do it with a single fiber, and it is possible to do it with more fibers.

The connectors 110 are shown to be connected to the transmitting circuitry through optical fiber cables 111 that are shown to be coming out of the housing 101 so these are already turned to go "UP" into the electrical conduits, avoiding the risk to bend and break the fibers when closing the wall plate to the wall-plate box. The housing 101 is compact, so it can fit into any existing TV, device, keystone or a wall-plate without requiring modifications. The housing 101 can be made of plastic, metal, and like material. Preferably, the material of the housing can provide a shield against EMI interferences. Alternatively, a layer of such material can be provided over the housing to isolate the interference. Moreover, the housing is dimensioned to easily fit to a standard receptacles. The interface, HDMI, display port, USB (various version) or thunderbolt interface can register with a keystone of a standard wall plate, an AV receiver or a TV. The optical transmitter or the optical receiver, disclosed herein, are compatible with standard receptacles commercially available. The housing with external optical connectors is compact enough to easily fit into a standard wall plate or attach in the back of a TV.

An interface 102 shown in FIG. 1 which is an electrical interface is available with dual feature; can be used to carry CEC or ARC/EARC signals, when those are not needed can be used as a data or command channel. Interface 102 can be a 7 pin connector or can be 2 of 3.5 mm jack or any other shape. To comply with HDMI standard, interface 102 has a specific pinout as shown in FIG. 1. Copper cables 103, 106 and 108 must be twisted and shielded with aluminum foil at 25% overlap, in order to avoid interferences and signal loss.

Removable optical transmitter 101 can be connected to 4 or 6 fibers, depending on the signals needed in HDMI. The fibers can have any optical termination 110.

Optical termination 110 connects to same kind of termination on the cable, composed with the same fiber optics and wires of the transmitter. Termination 110 can be connected to fiber optics extensions outside the enclosure 111 or can be attached directly on the enclosure 101.

Figure 6:
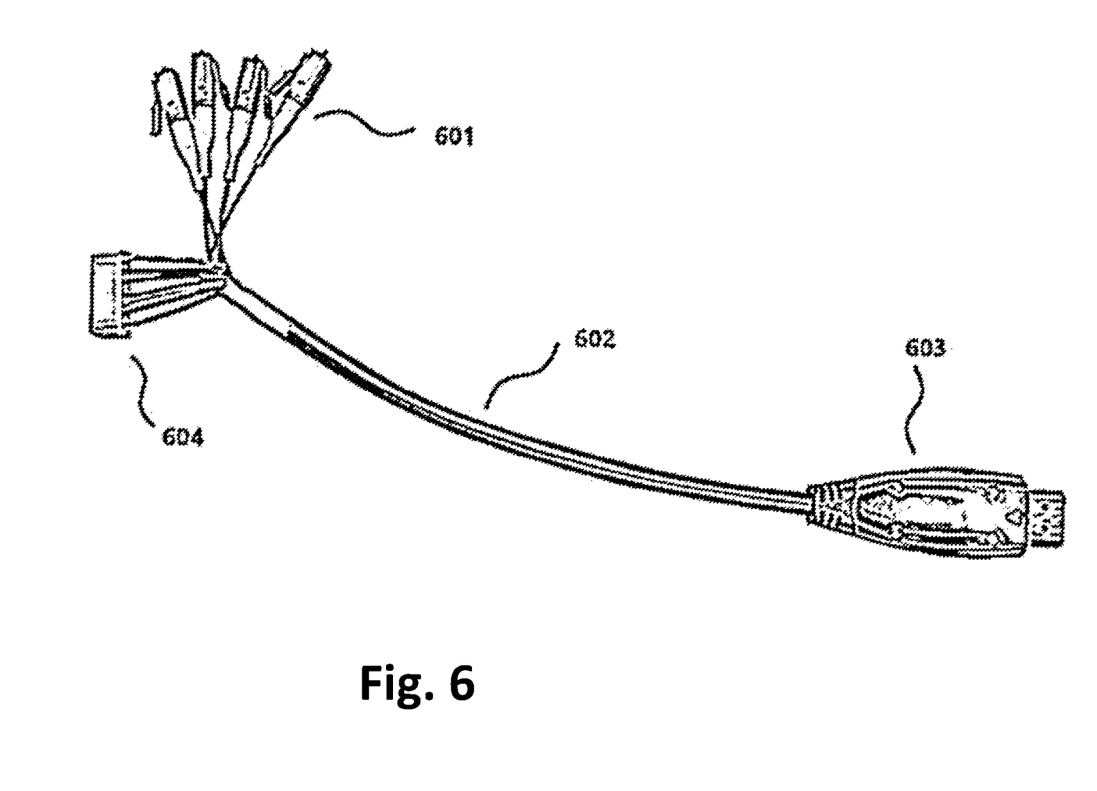
FIG. 6, FIG. 7, FIG. 8 and FIG. 9 are different examples of embodiments.
Figure 7:
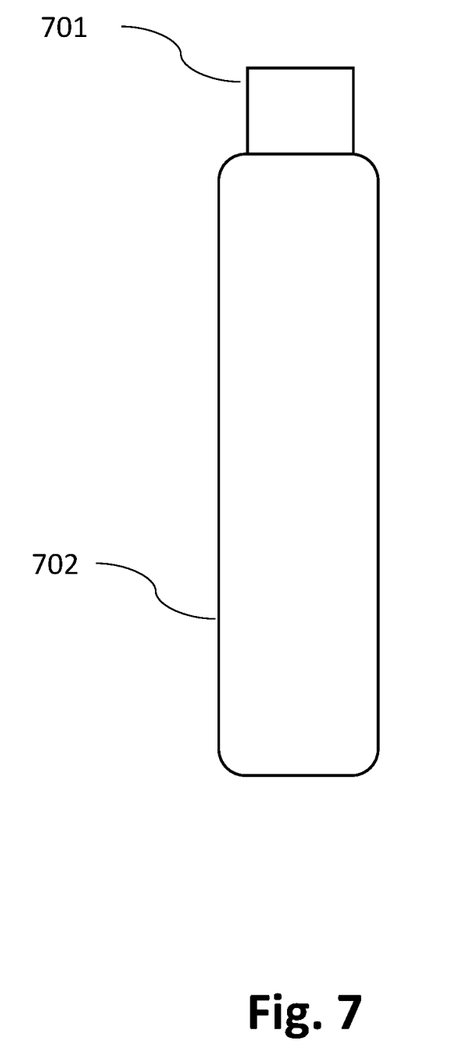
Figure 8:
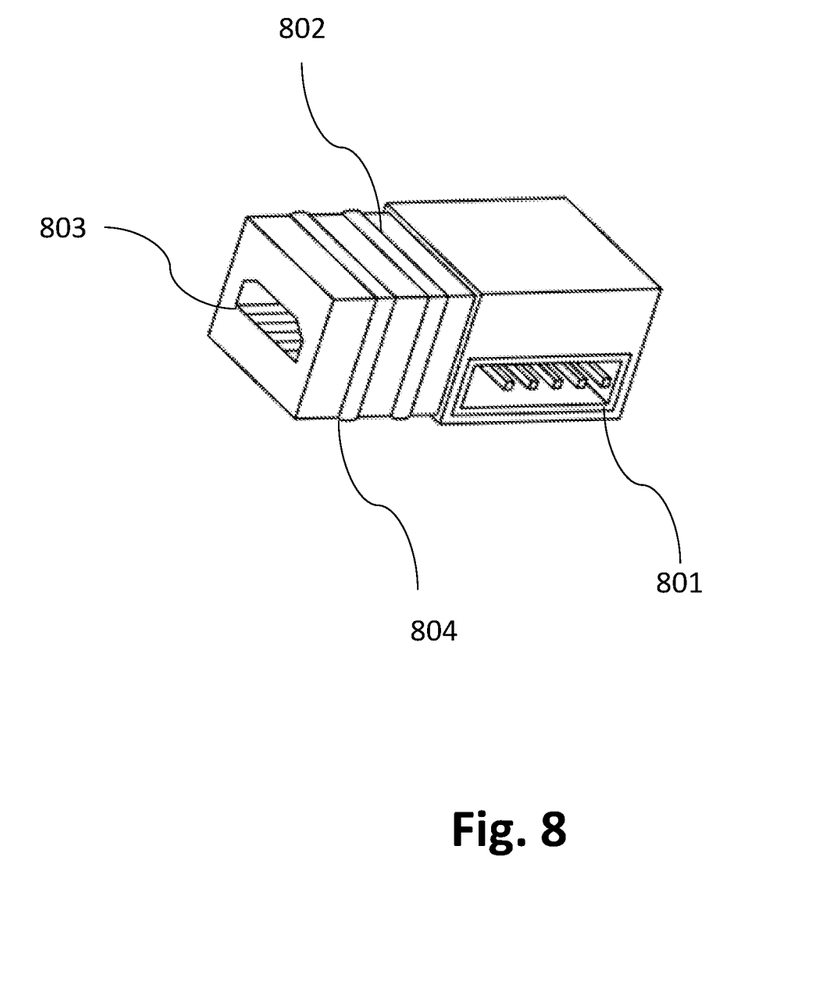
Figure 9:
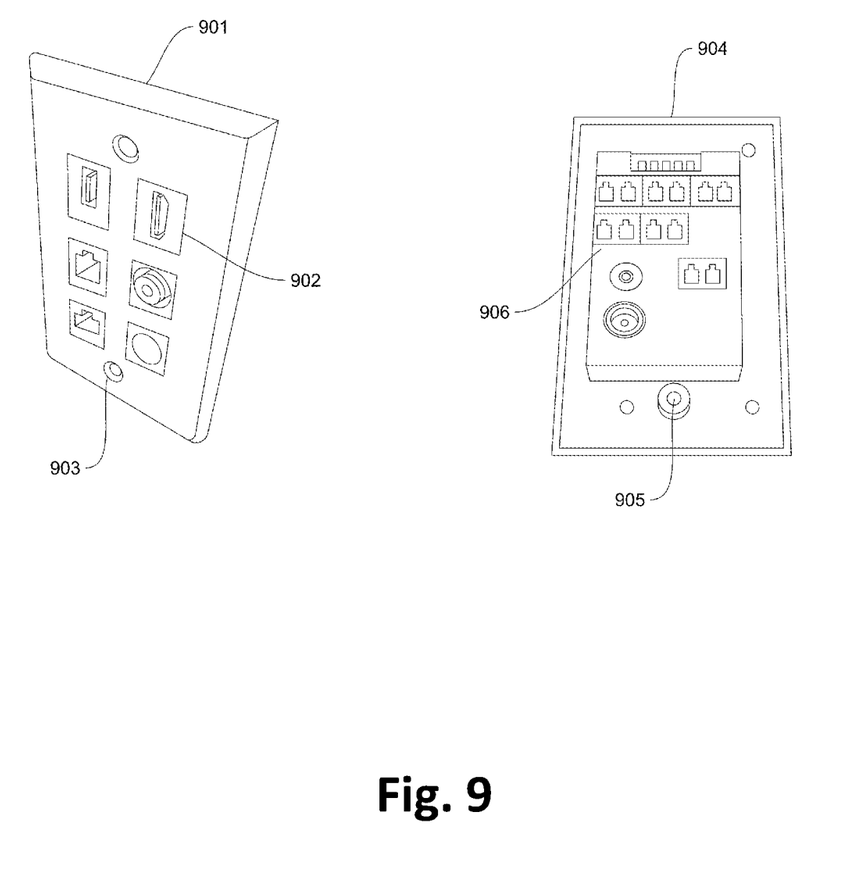

Connections 110 and 102 can be in the form of FIG. 6 with a pigtail, or in the form of FIG. 7 in a compact connector with cable plug integrated in the hard shell, or can be in the form of FIG. 8 in integrated in a standard keystone shell, or can be in the form of FIG. 9 integrated in a wallplate shell, or can be in any other external form or shell.

Connections 110 and 102 type can be any optical and electrical connection such as but not limited to LC connector, MPO connector, 3.5 mm Jack, Jtag or any other plug available and detachable.

Figure 2:
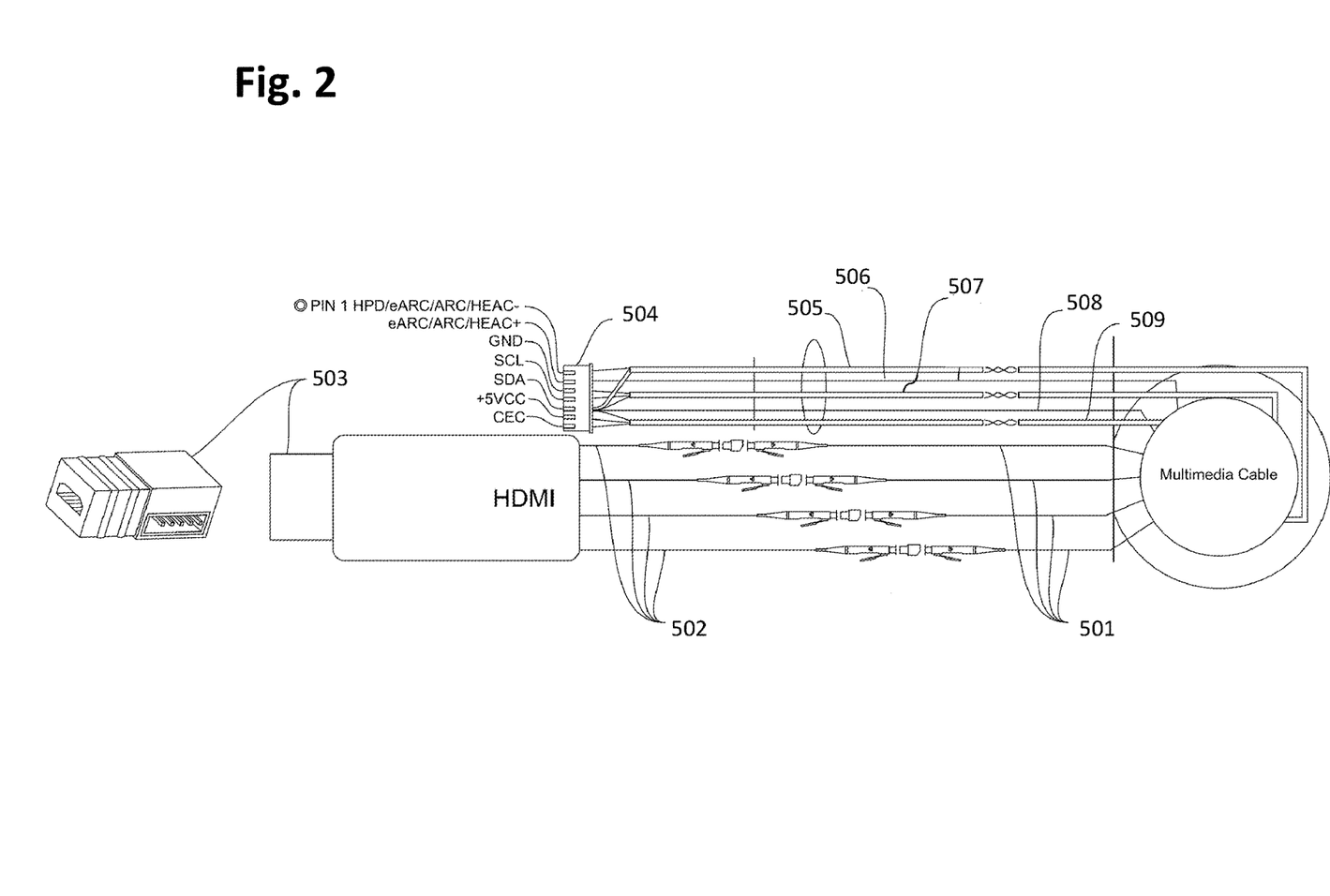
FIG. 2 is a front view of an optical receiver having an HDMI interface, according to an embodiment of the present invention.

Now referring to FIG. 2, which is a perspective view of an optical receiver 503 according to one implementation of the present invention. The optical receiver 503 is shown to be included in different models of housing enclosing a receiving circuitry and laser. The optical receiver 503 provides for high bandwidth data transfer over long distances, for example, 1000 feet and more without any lag. The optical receiver 503 can transfer full speed uncompressed video data through optical fiber cables. The optical receiver 503 can be powered by the source device, for example, set-top box. In one implementation, the laser can be VCSEL laser technology that can convert the HDMI (or display port or USB) electrical signals to light signals. The optical fibers offer negligible attenuation to the light signals up to 1000 feet, thus permitting 4K plus resolution uncompressed video data to be transmitted for more than 1000 feet without any significant lag. It is to be noted that any other laser known to a skilled person for converting electrical signals into light signals and vice versa, for transmitting/receiving the light signals through optical fiber cables can be used without departing from the scope of the present invention. Besides lasers, any technology known to a skilled person for converting electrical signals into light signals for receiving the light signals through optical fiber cables can be used without departing from the scope of the present invention.

In one aspect, the optical receiver 503 can receive audio & video data and control signals through optical fiber cables. Also, the optical receiver 503 consumes comparatively very much less power than conventional HDMI or Display extenders and thus can be powered by the source device itself. Thus, the optical receiver 503 only consumes electricity when in use, saving energy.

Referring to FIG. 2, four optical connectors 502 can be seen extending from the housing 503. The optical connectors 502 can be removably connected to any standard optical fiber cable, thus making the disclosed optical transmission system versatile. The connectors 502 allow the standard optical fiber cable to be removed and replaced. The standard optical fiber cable can be any commercially available optical fiber cables that can be provided with connectors compatible with the connectors 502 of optical receiver 503. For example, LC OM3 connectors, as shown in FIG. 1, can be used that are both economically and easily available, but seamlessly can be used an MPO connector. The four fiber optics 502 can be single fibers with LC connector or four to six fibers going into a single MPO connector standard, or can be a different number of optical fibers with a detachable connector without departing from the scope of the present invention.

The connectors 502 are shown to be connected to the receiving circuitry through optical fiber cables that are shown to be coming out of the housing 503 and can be turned to go "UP" into the electrical conduits, avoiding the risk to bend and break the fibers when closing the wall plate to the wall-plate box. The housing 503 is compact, so it can fit into any existing TV, device, keystone or a wall-plate without requiring modifications. The housing 503 can be made of plastic, metal, and like material. Preferably, the material of the housing can provide a shield against EMI interferences. The connection 502 to 503 can be with a fiber optic cable outside the housing 503 or 502 can be in the housing itself without departing from the scope of the present invention.

Alternatively, a layer of such material can be provided over the housing to isolate the interference. Moreover, the housing is dimensioned to easily fit to a standard receptacles. The HDMI interface or the USB interface can register with a keystone of a standard wall plate, an AV receiver or a TV. The optical transmitter or the optical receiver, disclosed herein, are compatible with standard receptacles commercially available. The housing with external optical connectors is compact enough to easily fit into a standard wall plate or attach in the back of a TV.

An interface 504 shown in FIG. 2 which is an electrical interface is available with dual feature; can be used to carry CEC or EARC signals, when those are not needed can be used as a data or command channel. Interface 504 can be a 7 pin connector or can be 2 of 3.5 mm jack or any other shape. To comply with HDMI standard, interface 504 has a specific pinout as shown in FIG. 2. Copper cables 509, 507 and 509 must be twisted and shielded with aluminum foil at 25% overlap, in order to avoid interferences and signal loss.

Removable optical receiver 503 can be connected to 4 or 6 fibers, depending on the signals needed in HDMI. The fibers can have any optical termination without departing from the scope of the present invention.

Optical termination 502 connects to same kind of termination on the cable, composed with the same fiber optics and wires of the transmitter. Termination 502 can be connected to fiber optics extensions outside the enclosure 111 or can be attached directly on the enclosure 101.

Connections 504 and 502 can be in the form of FIG. 6 with a pigtail, or in the form of FIG. 7 in a compact connector with cable plug integrated in the hard shell, or can be in the form of FIG. 8 in integrated in a standard keystone shell, or can be in the form of FIG. 9 integrated in a wallplate shell, or can be in any other external form or shell.

Connections 504 and 502 type can be any optical and electrical connection such as but not limited to LC connector, MPO connector, 3.5 mm Jack, Jtag or any other plug available and detachable.

Figure 3:
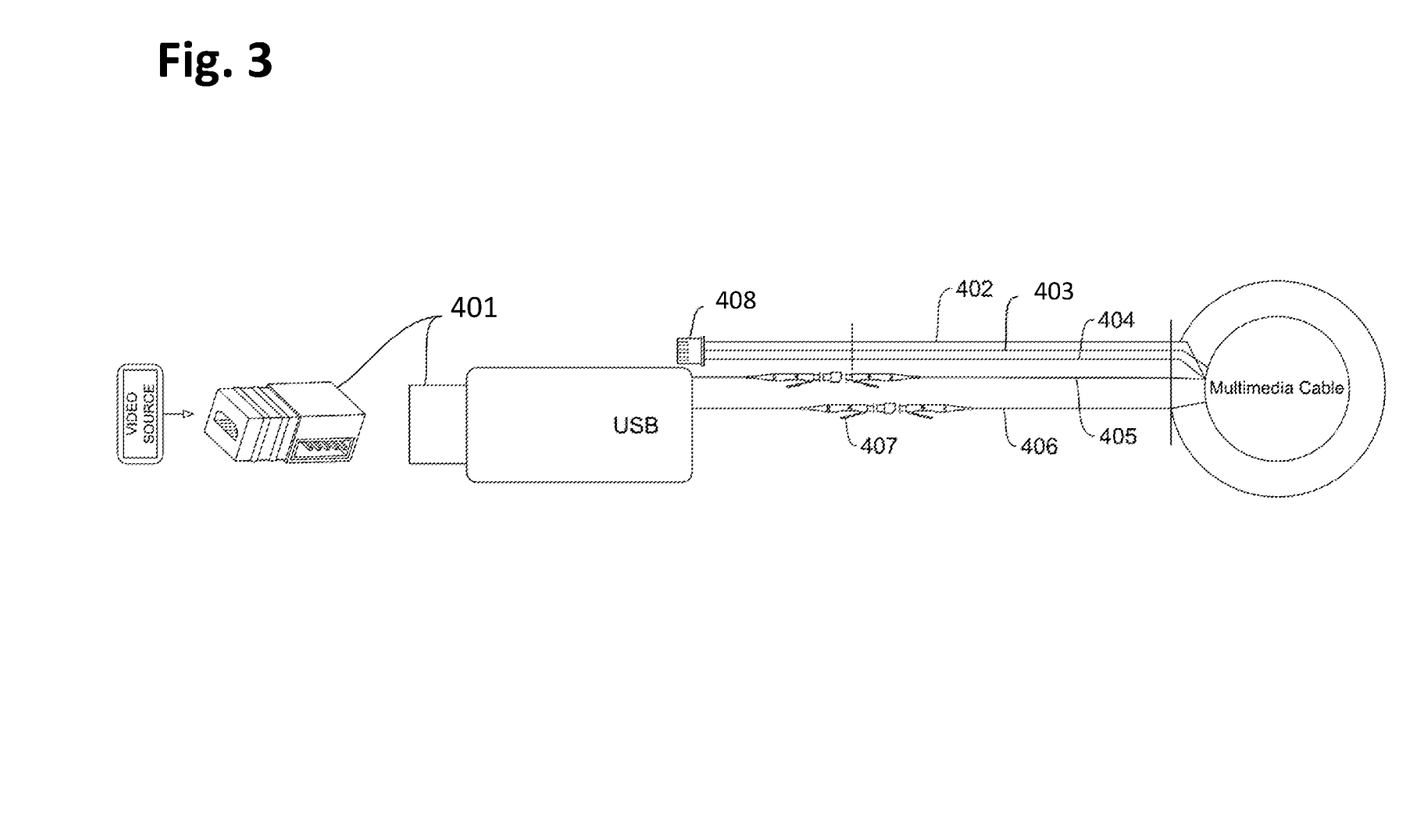
FIG. 3 is a perspective view of an optical transmitter having a USB interface, according to an embodiment of the present invention.

FIG. 3 is the same as FIG. 1 but showing a USB transmitting connection instead of HDMI. Also, unlike the four optical connectors for HDMI, two optical connectors 407 can transmit the bitrate of the latest USB 3.x and coming 4.x standards. The number of connectors depends upon input from the source device, and the number of connectors can vary without departing from the scope of the present invention. Furthermore, port 401 is also shown that is having 3 electrical pins.

FIG. 3 differs from FIG. 1, because USB requires a different number of connections. Differently from FIG. 1 item 101, connector 401 has only 3 copper cables 402, 403, 404 to handle hot plug and power. Connector 401 can be in the form of Jtag, USBc, thunderbolt, 3.5 mm, or any other termination without departing from the scope of the present invention. Two wires can be enough, however since USB can use a lot of power (recharge phones, turn on controllers and much more) we highly recommend to use 3 pins of which 2 wires for +5 vdc with more milliamperes, and the ground made with the cable drain conductor and the shield foil in order to have more milliamperes.

FIG. 3 shows 2 fiber optics 407 connected to the USB shell transmitter 408, that can be male or female.

Connections 401 and 407 can be in the form of FIG. 6 with a pigtail, or in the form of FIG. 7 in a compact connector with cable plug integrated in the hard shell, or can be in the form of FIG. 8 in integrated in a standard keystone shell, or can be in the form of FIG. 9 integrated in a wallplate shell, or can be in any other external form or shell.

Connections 504 and 502 type can be any optical and electrical connection such as but not limited to LC connector, MPO connector, 3.5 mm Jack, Jtag or any other plug available and detachable.

Figure 4:
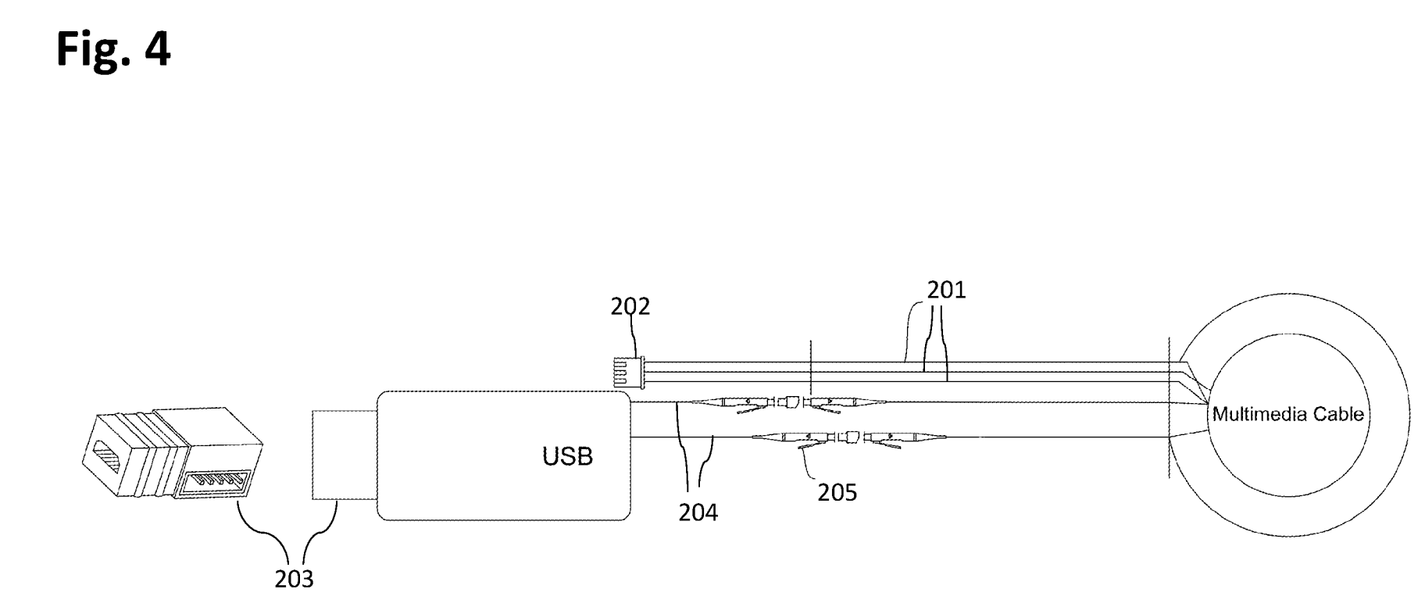
FIG. 4 is a perspective view of an optical receiver having a USB interface, according to an embodiment of the present invention.

FIG. 4 is the same as FIG. 2 but showing a USB receiving connection instead of HDMI. Also, unlike the four optical connectors for HDMI, two optical connectors 205 can transmit the bitrate of the latest USB 3.x and coming 4.x or thunderbolt standards. The number of connectors depends upon input from the source device, and the number of connectors can vary without departing from the scope of the present invention. Furthermore, port 202 is also shown that is having 3 electrical pins.

FIG. 4 differs from FIG. 2, because USB requires a different number of connections. Differently from FIG. 2 item 504, connector 202 has only 3 copper cables 201 handle hot plug and power. Connector 202 can be in the form of Jtag, USBc, 3.5 mm or any other termination without departing from the scope of the present invention. Two wires can be enough, however since USB can use a lot of power (recharge phones, turn on controllers and much more) we highly recommend to use 3 pins of which 2 wires for +5 vdc with more milliamperes, and the ground made with the cable drain conductor and the shield foil in order to have more milliamperes.

FIG. 4 shows 2 fiber optics 204 connected to the USB shell receiver 203, that can be male or female.

Connections 205 and 202 can be in the form of FIG. 6 with a pigtail, or in the form of FIG. 7 in a compact connector with cable plug integrated in the hard shell, or can be in the form of FIG. 8 in integrated in a standard keystone shell, or can be in the form of FIG. 9 integrated in a wallplate shell, or can be in any other external form or shell without departing from the scope of the present invention.

Connections 202 and 204 type can be any optical and electrical connection such as but not limited to LC connector, MPO connector, 3.5 mm Jack, Jtag or any other plug available and detachable without departing from the scope of the present invention.

Figure 5:
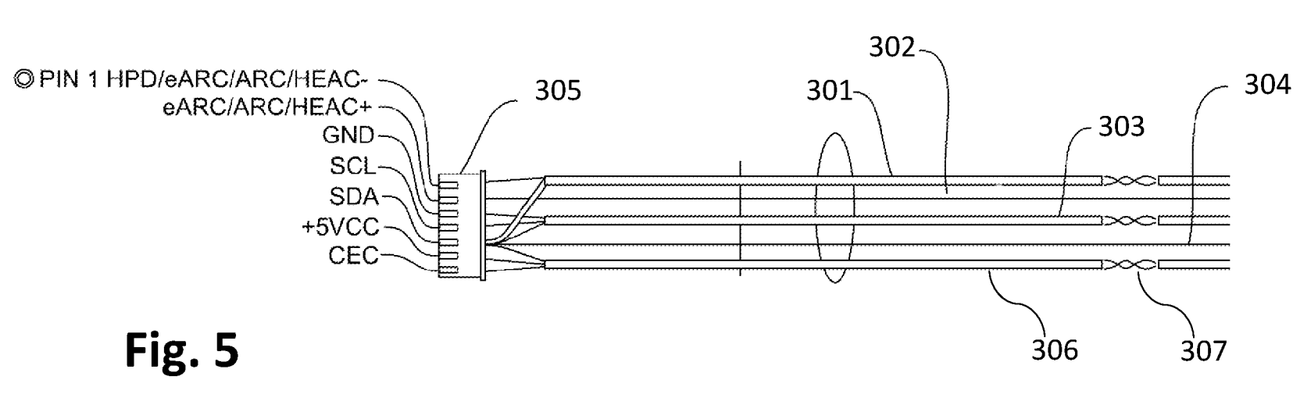
FIG. 5 shows the electrical connection needed to reflect the HDMI standard, or data connection or infrared connection.

FIG. 5 shows in detail the pins of 305 where 301, 306 and 306 are twisted and shielded with aluminum foil with overlap at 25%. 304 and 302 are single wires FIG. 6 shows a potential shape for the transmitter/receiver detachable plug. 603 is the housing of the HDMI or USB or thunderbolt plug, 602 is the pigtail coming out of the housing and carrying mixed fibers and wires. 604 is the electrical pinout and can be any form of electrical connector without departing from the scope of the present invention; 601 is the optical termination that can be in the form of LC connectors, MCO connectors, or any other standard connector without departing from the scope of the present invention.

FIG. 7 shows an alternative housing, more compact, where 701 id the HDMI/USB or thunderbolt termination, and 702 is the side of the house where wires and fibers are connected.

FIG. 8 Shows an alternative view of the housing, keystone standard, where 801 is the wire and optical connection which can be positioned on any side of the housing, 802 and 804 are dents to hold the housing in the plates; 803 is the USB/HDMI/thunderbolt/display port connection.

FIG. 9 shows an alternative view of the housing, where the transmitter/receiver can be integrated in a wallplate. 901 is the front view of the wallplate, the side facing the room; 902 is the connection (USB/HDMI/thunderbolt/display port) and 903 shows the wholes to screw the plate in the wall. The back of the plate 904 has the connections 906 to the cable and the whole 905 to screw the plate in the wall. 906 connection can be optical (MPO, LC or other) and electrical (any form of electrical plug)

Any other shell shape can be adopted without departing from the scope of the present invention.

Figure 10:
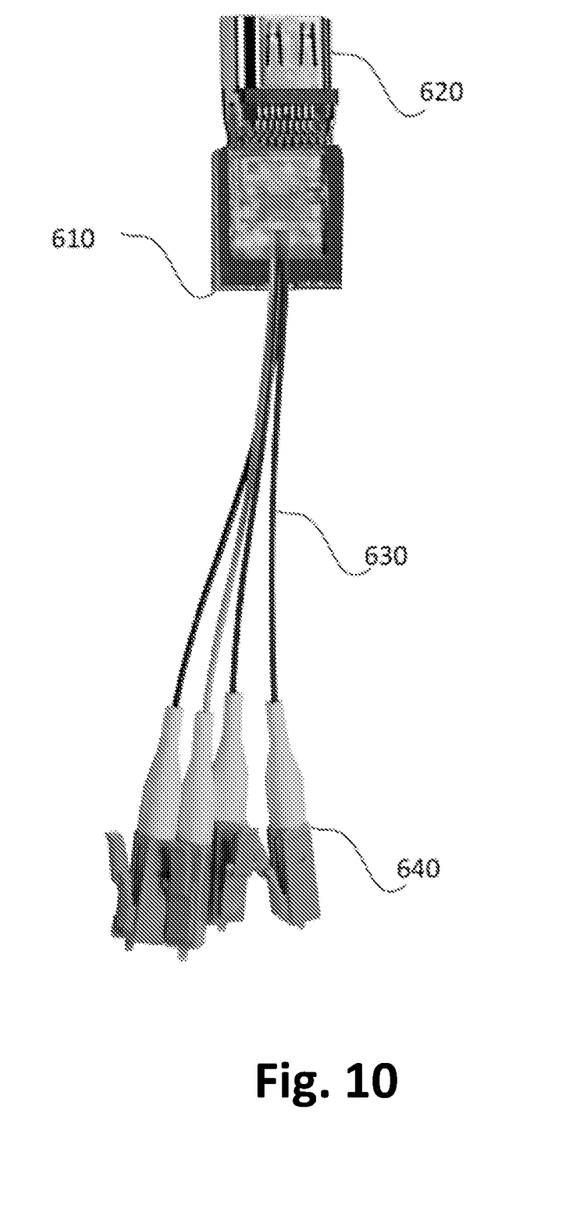
FIG. 10, FIG. 11 is a drawing of the VCSEL converter.

FIG. 10 shows the transmitting circuitry 610 of the optical transmitter/receiver. The HDMI interface 620 is shown connected to the transmitting circuitry 610. Furthermore, the four connectors 640 are connected to the circuitry 610 through four optical cables 630. The four connectors 640 can be 4 separate connectors LC or a single connector MPO or any other connector without departing from the scope of the present invention.

Figure 11:
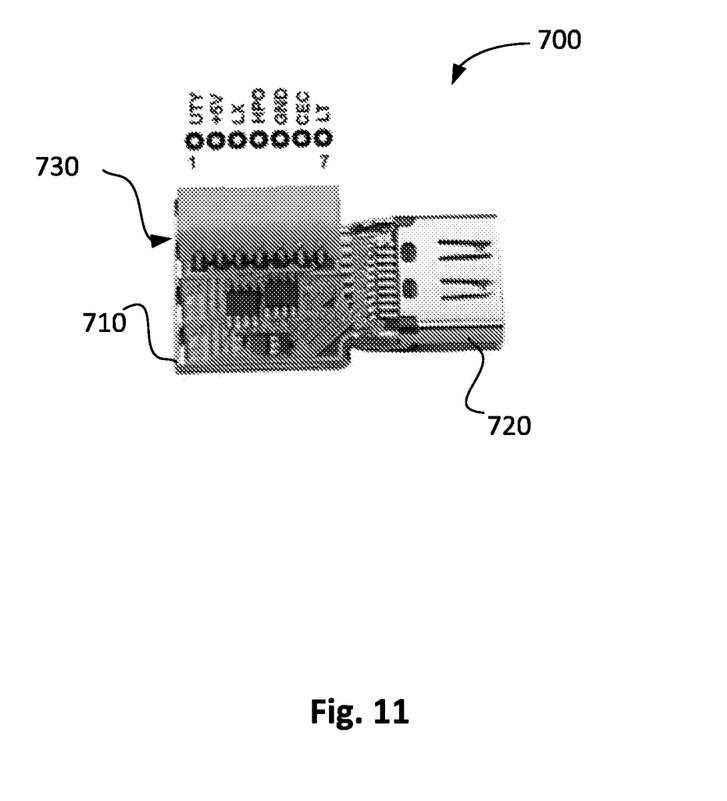

FIG. 11 is the transmitting circuitry 700 of the optical transmitter/receiver further showing the seven electrical pins of the port 102 and 504 shown in FIG. 1 and FIG. 2. The FIG. 11 also shows the HDMI interface 720. The seven electrical pins allow communication between the optical transmitter and an optical receiver. Embodiment examples of the optical receiver are shown in FIG. 6, FIG. 7, FIG. 8, FIG. 9 but are not limited to it. In certain implementations, at least one of the electrical pins can power the optical receiver by the optical transmitter.

In one implementation, the optical transmission/reception system disclosed herein can incorporate single-mode or multi-mode transmission based upon the distance to be covered. Also, the type of the optical fibers used can be varied depending upon the desired bandwidth and the distance covered. Single-mode and multi-mode transmissions are known in the art.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. An easily removable connection system for mixed fiber and electric connections comprising:
    an optical transmitter comprising:
        a transmitting circuitry configured to receive electrical signals from a source device;
        a first interface electrically connected to the transmitting circuitry and configured to connect the transmitting circuitry to the source device;
        at least one laser configured into the transmitting circuitry for converting the electrical signals into light signals; and
        a plurality of first optical connectors connected to the transmitting circuitry for receiving the light signals, the plurality of first optical connectors configured to removably connect to a plurality of transmitting optical fiber connectors for transmitting light signals;
    an optical receiver comprising:
        a receiving circuitry configured to receive the light signals;
        a second interface electrically connected to the receiving circuitry and configured to connect the receiving circuitry to a target device for transmitting the electrical signals to the target device; and
        a plurality of second optical connectors connected to the receiving circuitry, the plurality of second optical connectors configured to removably connect to a plurality of receiving optical fibers connectors for receiving the light signals; and
    a plurality of optical fibers connected at one end to the plurality of transmitting optical fiber connectors and another end to the plurality of receiving optical fiber connectors,
    wherein the plurality of first optical connectors are connected to the transmitting circuitry through a plurality of first optical fibers and the plurality of second optical connectors are connected to the receiving circuitry through a plurality of second optical fibers,
    wherein the optical transmitter comprises a first socket, the first socket has a plurality of electrical pins connected to the transmitting circuitry through a plurality of first conductors; wherein the optical receiver comprises a second socket, the second socket has a plurality of electrical pins connected to the receiving circuitry through a plurality of second conductors, wherein the first socket and the second socket are configured to be connected to a plurality of conductors for electrically connecting the transmitting circuitry to the receiving circuitry.

2. The easily removable connection system of claim 1, wherein the first and second interfaces are HDMI or display port interfaces.

3. The easily removable connection system of claim 1, wherein the first and second interfaces are USB or thunderbolt interfaces.

4. The easily removable connection system of claim 1, wherein each of the transmitting circuitry and the receiving circuitry further comprises a plurality of electrical pins configured for electrically connecting the transmitting circuitry to the receiving circuitry through electrical conductors.

5. The easily removable connection system of claim 4, wherein at least one of the plurality of electrical pins is configured to power the optical receiver by the optical transmitter.

6. The easily removable connection system of claim 5, wherein the optical transmitter is powered by the source device.

7. The easily removable connection system of claim 4, wherein at least one of the plurality of electrical pins is configured to transmit control signals.

8. The easily removable connection system of claim 1, wherein the at least one laser is a vertical-cavity surface-emitting laser.

9. The easily removable connection system of claim 2, wherein the plurality of first optical connectors are four in number and the plurality of second optical connectors are four in number.

10. The easily removable connection system of claim 3, wherein the plurality of first optical connectors are two in number and the plurality of second optical connectors are two in number.

11. The easily removable connection system of claim 10, wherein the plurality of first optical connectors are connected to the transmitting circuitry through two first optical fibers, and the plurality of second optical connectors are connected to the receiving circuitry through two second optical fibers.

12. The easily removable connection system of claim 4, wherein each of the transmitting circuitry and the receiving circuitry comprises seven electrical pins.

13. The easily removable connection system of claim 1, wherein the optical transmitter is configured to transmit the light signals up to 1000 feet.

14. The easily removable connection system of claim 4, wherein the plurality of electrical pins in each of the optical transmitter and the optical receiver are configured in a male socket, the male socket configured to receive a female socket.

15. The easily removable connection system of claim 4, wherein the easily removable connection system further comprises the electrical conductors.

16. The easily removable connection system of claim 14, wherein the optical transmitter comprises a housing, the housing encases the first interface, the transmitting circuitry, and the male socket.

17. The easily removable connection system of claim 1, wherein the optical transmitter comprises a housing, the housing encases the first interface and the transmitting circuitry, the plurality of first conductors extends through the housing, wherein the plurality of first conductors are twisted and shielded with aluminum foil at 25% overlap.

18. A method for mixed fiber and electric connections, the method comprising:
    providing an easily removable connection system for mixed fiber and electric connections, the easily removable connection system comprises:

an optical transmitter comprising:
　　a transmitting circuitry configured to receive electrical signals from a source device,
　　a first interface electrically connected to the transmitting circuitry and configured to connect the transmitting circuitry to the source device,
　　at least one laser configured into the transmitting circuitry for converting the electrical signals into light signals, and
　　a plurality of first optical connectors connected to the transmitting circuitry for receiving the light signals, the plurality of first optical connectors configured to removably connect to a plurality of transmitting optical fiber connectors for transmitting light signals; and an optical receiver comprising:
　　a receiving circuitry configured to receive the light signals;
　　a second interface electrically connected to the receiving circuitry and configured to connect the receiving circuitry to a target device for transmitting the electrical signals to the target device; and
　　a plurality of second optical connectors connected to the receiving circuitry, the plurality of second optical connectors configured to removably connect to a plurality of receiving optical fibers connectors for receiving the light signals; and
　　a plurality of optical fibers connected at one end to the plurality of transmitting optical fiber connectors and another end to the plurality of receiving optical fiber connectors, wherein the plurality of first optical connectors are connected to the transmitting circuitry through a plurality of first optical fibers and the plurality of second optical connectors are connected to the receiving circuitry through a plurality of second optical fibers, wherein the optical transmitter comprises a first socket, the first socket has a plurality of electrical pins connected to the transmitting circuitry through a plurality of first conductors; wherein the optical receiver comprises a second socket, the second socket has a plurality of electrical pins connected to the receiving circuitry through a plurality of second conductors, wherein the first socket and the second socket are configured to be connected to a plurality of conductors for electrically connecting the transmitting circuitry to the receiving circuitry;

connecting the transmitting circuitry to the source device; and connecting the receiving circuitry to the target device.

* * * * *